United States Patent van den Nieuwelaar et al.

[11] Patent Number: 6,152,816
[45] Date of Patent: Nov. 28, 2000

[54] METHOD AND DEVICE FOR PROCESSING SLAUGHTERED POULTRY, AS WELL AS CONVEYOR MEMBER FOR USE IN SUCH A METHOD AND DEVICE

[75] Inventors: Andrianus J. van den Nieuwelaar, Gemert; Engelbert J. J. Teurlinx, Stevensbeek; Bastiaan W. J. E. J. Drabbels, Vierlingsbeek; Cornelis D. van Harskamp, Boxmeer, all of Netherlands

[73] Assignee: Stork PMT B.V., Boxmeer, Netherlands

[21] Appl. No.: 09/483,031

[22] Filed: Jan. 13, 2000

Related U.S. Application Data

[63] Continuation of application No. PCT/NL98/00386, Jul. 7, 1998.

[30] Foreign Application Priority Data

Jul. 14, 1997 [NL] Netherlands .......................... 1006580

[51] Int. Cl.⁷ .................................................. A22C 21/00
[52] U.S. Cl. .......................... 452/177; 452/182; 452/106; 198/465.1
[58] Field of Search ................................... 452/177, 183, 452/182, 106, 111, 112, 117, 118; 198/347.1, 448, 465.2, 465.1, 463.3

[56] References Cited

U.S. PATENT DOCUMENTS

| | | | |
|---|---|---|---|
| 2,516,499 | 7/1950 | Albright | 452/177 |
| 3,538,325 | 11/1970 | Smith et al. | |
| 3,559,233 | 2/1971 | Bottomley et al. | |
| 4,413,376 | 11/1983 | Linville | 452/183 |
| 4,467,498 | 8/1984 | Graham et al. | |
| 4,538,325 | 9/1985 | Harben, Jr. et al. | 452/111 |
| 5,026,317 | 6/1991 | Kennedy | 452/117 |
| 5,098,333 | 3/1992 | Cobb | 452/117 |
| 5,277,650 | 1/1994 | Meyn | 452/117 |
| 5,299,975 | 4/1994 | Meyn | 452/177 |
| 5,318,428 | 6/1994 | Meyn | 452/106 |
| 5,334,083 | 8/1994 | van den Nieuwelaar et al. | 452/117 |

FOREIGN PATENT DOCUMENTS

| | | |
|---|---|---|
| 0 512 636 A1 | 11/1992 | European Pat. Off. |
| 0 530 868 A1 | 3/1993 | European Pat. Off. |
| 0 538 943 A1 | 4/1993 | European Pat. Off. |
| 0 587 253 A2 | 3/1994 | European Pat. Off. |
| WO96/16553 | 6/1996 | WIPO |
| WO99/03354 | 1/1999 | WIPO |

OTHER PUBLICATIONS

International Search Report issued in PCT/NL98/00386.
Search Report issued in NL1006580.

*Primary Examiner*—Willis Little
*Attorney, Agent, or Firm*—Kristin L. Johnson; Kilpatrick Stockton LLP

[57] ABSTRACT

In a device and method for processing slaughtered poultry, the following steps are carried out: drawing the viscera package out of the carcass of the poultry; separating the viscera package from the carcass; conveying the viscera package in a viscera package conveyor member; conveying the carcass in a carcass conveyor member; and inspecting the viscera package and the carcass. The viscera package conveyor member and the carcass conveyor member are coupled together at least during the inspection. The viscera package conveyor member and the carcass conveyor member may form part of one combined conveyor member. Prior to the inspection, at least the intestines, and in particular the intestines and the gall bladder, are removed from the viscera package.

42 Claims, 13 Drawing Sheets

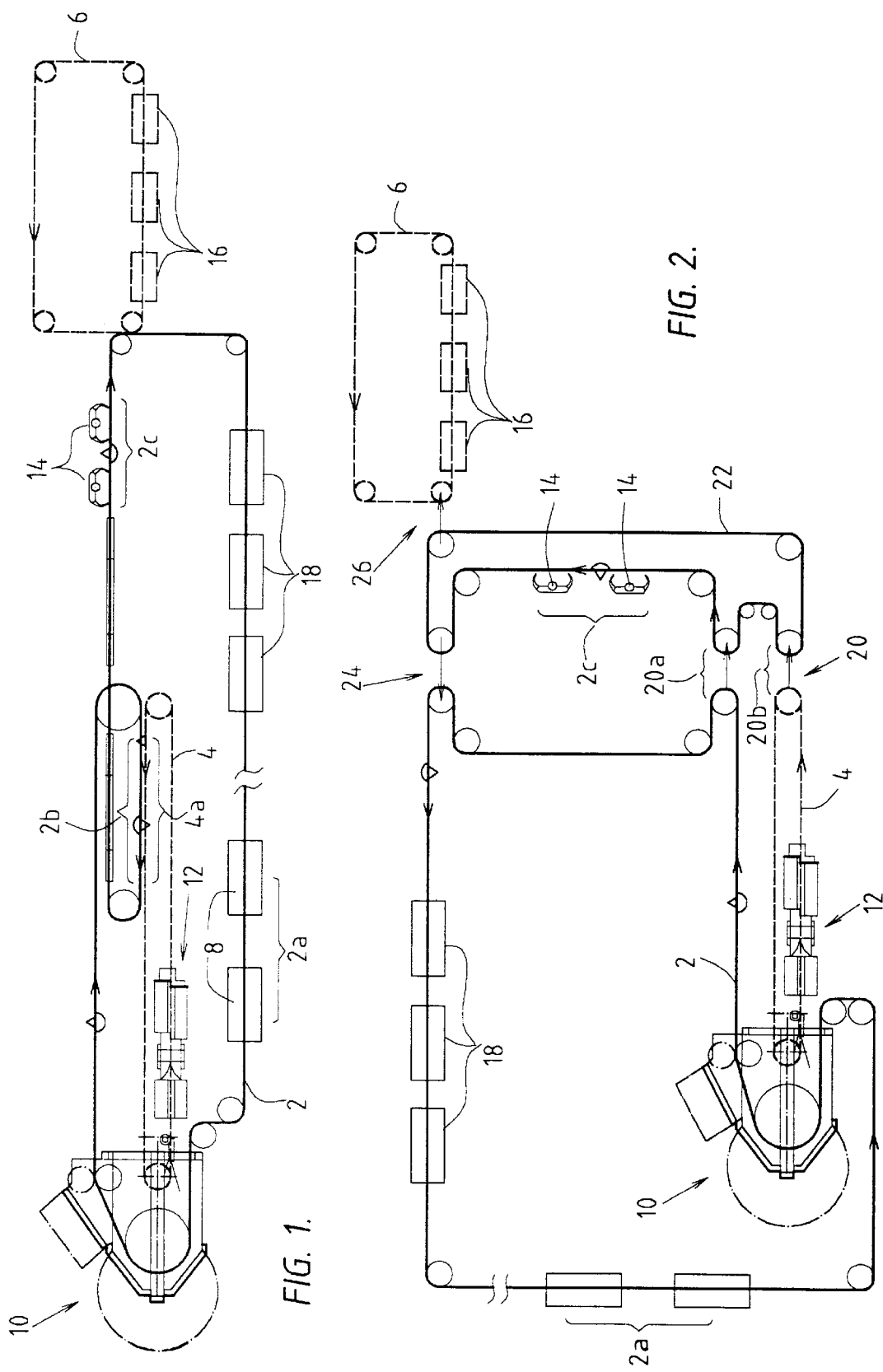

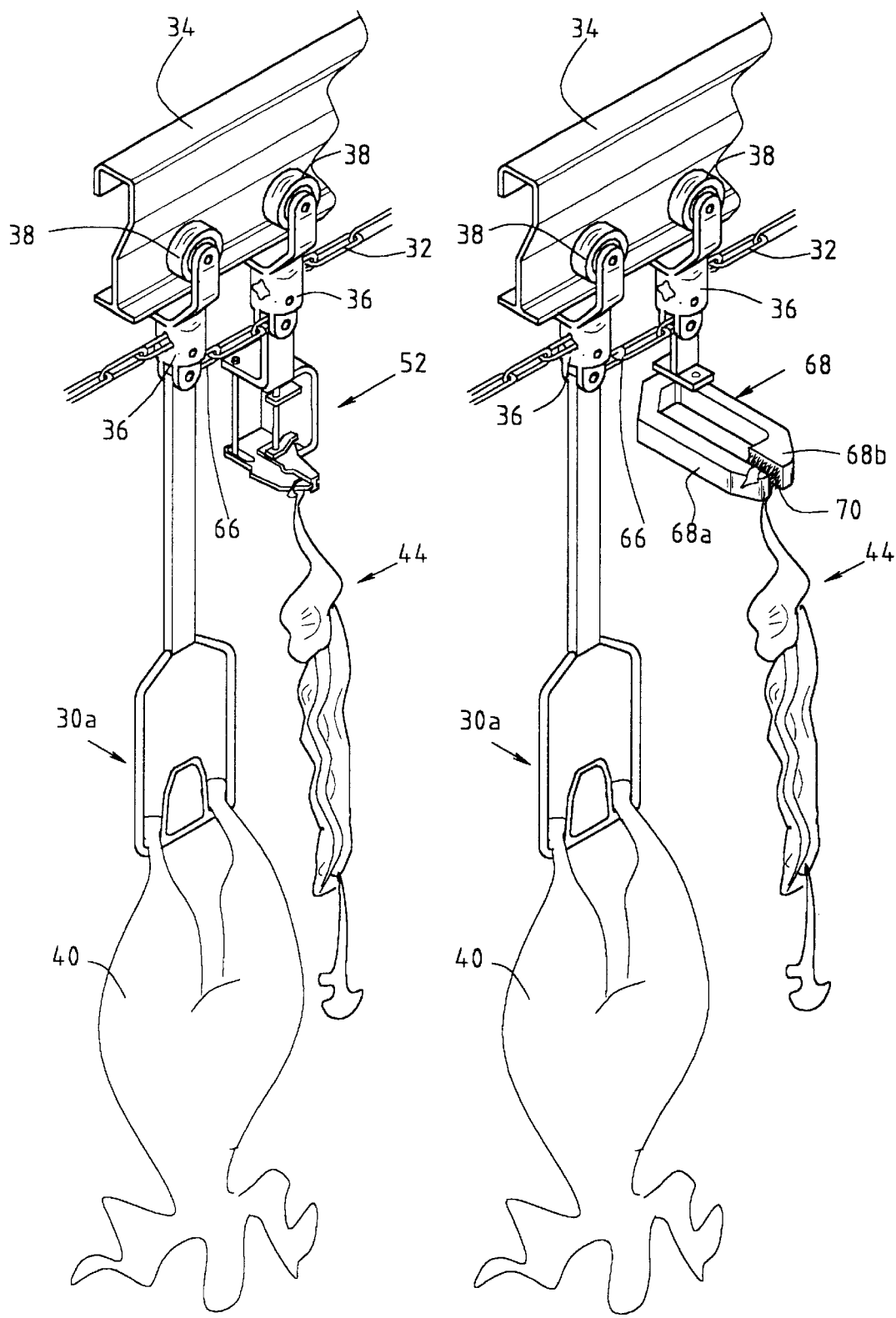

METHOD AND DEVICE FOR PROCESSING SLAUGHTERED POULTRY, AS WELL AS CONVEYOR MEMBER FOR USE IN SUCH A METHOD AND DEVICE

CROSS-REFERENCE TO RELATED APPLICATIONS

This is a continuation application of PCT/NL98/00386 filed Jul. 7, 1998 now IPN: WO 99/03354, filed Jan. 28, 1999.

BACKGROUND OF THE INVENTION

This method relates to a method for processing slaughtered poultry, comprising the steps of: drawing the viscera package out of the carcass of the poultry; separating the viscera package from the carcass; conveying the viscera package in an viscera package conveyor member; conveying the carcass in a carcass conveyor member; and inspecting the viscera package and the carcass. The invention also relates to a device for carrying out the abovementioned method steps.

DISCUSSION OF THE PRIOR ART

A method and device of this kind are known, for example, from U.S. Pat. No. 4,538,325 or EP-A-0,530,868, in which it is described that the viscera are removed from the poultry and separated therefrom, after which the carcass and the viscera are each advanced through an inspection station in conveyor members of separate conveyors.

Particularly in the inspection station, the separate conveyors take up a considerable amount of space, which is disadvantageous with a view to efficient operation.

With a view to reliable examination, it is important that a carcass and its associated viscera package pass the inspection station synchronously, so that if the viscera package is rejected the carcass from which they have been taken can be identified without fail, and both the viscera package and the carcass can be removed from the respective conveyors.

In the prior art, the required synchronization of the conveyors leaves something to be desired as a result of expansion, contraction and elasticity of the flexible couplings, in the form of chains, between the conveyor members of the viscera packages and carcasses, which effects cannot be well controlled. In addition, unsatisfactory synchronization of the drives of the various conveyors contributes to the viscera packages and carcasses falling out of step in an undesired manner in the inspection station.

With regard to the inspection itself, it is important, with a view to reliable examination, that the parts of the poultry to be examined are exposed and that the view of these parts and their accessibility are not impeded by other parts of the poultry and/or parts of the conveyors. Furthermore, the number of moving parts in the field of view of an inspector should be limited, in order not to distract the attention of the inspector from the poultry parts to be inspected. The prior art is able to fulfil these requirements only to a limited extent.

SUMMARY OF THE INVENTION

The object of the invention is to overcome the drawbacks of the known methods and devices at least in part and to ensure reliable synchronization of the viscera package and the carcass in the inspection station, providing a clear presentation of the parts to be inspected.

This object is attained in the method according to the invention in that the viscera package conveyor member and the carcass conveyor member are coupled together by a coupling which moves together with the viscera package conveyor member and the carcass conveyor member at least during the inspection.

Preferably, the viscera package conveyor member and the carcass conveyor member form part of one combined conveyor member. The combined conveyor member carries both the carcass and the associated viscera, so that firstly synchronization of the two parts of the poultry is ensured and secondly it is possible to achieve a good view of and good accessibility to the poultry parts with a small number of moving parts in the field of view of an inspector.

The viscera package conveyor member and the carcass conveyor member are coupled together before the viscera package and the carcass reach the inspection station. In this case, after the viscera package has been drawn and separated the carcass can be conveyed by a first conveyor and the viscera package can be conveyed by a second conveyor. In a preferred embodiment, prior to the inspection the viscera package is then transferred from the second conveyor to the first conveyor, the inspection of the viscera package conveyed by the first conveyor and the carcass conveyed by the first conveyor then taking place. After the inspection the viscera package can be transferred back from the first conveyor to the second conveyor. In another preferred embodiment, prior to the inspection the carcass is transferred from the first conveyor to the second conveyor, the inspection of the viscera package conveyed by the second conveyor and the carcass conveyed by the second conveyor then taking place. After the inspection the carcass can be transferred back from the second conveyor to the first conveyor. In yet another preferred embodiment, prior to the inspection the viscera package is transferred from the second conveyor to a third conveyor and the carcass is transferred from the first conveyor to the third conveyor, the inspection of the viscera package conveyed by the third conveyor and the carcass conveyed by the third conveyor then taking place. After the inspection the carcass and/or the viscera package can be transferred back from the third conveyor to the first and second conveyor, respectively. In a further preferred embodiment, prior to the inspection the viscera package is transferred from the second conveyor to a third conveyor, the inspection of the viscera package conveyed by the third conveyor and the carcass conveyed by the first conveyor then taking place. After the inspection the viscera package can be transferred back from the third conveyor to the second conveyor. In another further preferred embodiment, prior to the inspection the carcass is transferred from the first conveyor to a third conveyor, the inspection of the viscera package conveyed by the second conveyor and the carcass conveyed by the third conveyor then taking place. After the inspection the carcass can be transferred back from the third conveyor to the first conveyor. The path length of the first conveyor and the second conveyor need only be short, so that there are no problems of synchronization. For the inspection, only one conveyor is involved, so that the number of moving parts in the field of view of the inspector is limited.

In certain cases, it may be difficult to transfer the viscera package and/or the carcass, the dimensions and tissue properties of which may differ from bird to bird, from one conveyor to a subsequent conveyor. To overcome such difficulties, the invention provides the possibility of the transfer of the viscera package and/or the carcass taking place together with the associated viscera package conveyor member or carcass conveyor member, respectively, the fixed dimensions and properties of the conveyor members ensuring that they are transferred reliably.

In a particularly advantageous variant of the method according to the invention, use is made of a combined conveyor member and the viscera package is transferred to the combined conveyor member immediately after they have been drawn and separated from the carcass. If this method is used, it is only necessary to use one conveyor between a drawing and separating device and an inspection station: the combined conveyor member feeds the carcass, still containing the viscera package, to the drawing and separating device, where the viscera package is removed from the carcass. After separating the viscera package from the carcass, the viscera package is moved directly into the combined conveyor member, after which the combined conveyor member is conveyed, together with the carcass and the viscera package, to the inspection station.

When conveying viscera, there is a risk in particular of parts of the poultry being infected undesirably by substances released from the intestines and the gall bladder. In order to reduce such risks, at least the intestines, and in particular the intestines and the gall bladder, are removed from the viscera package prior to the inspection. A further reduction in risk is achieved by removing at least the intestines, and in particular the intestines and the gall bladder, from the carcass before drawing the viscera package out of the carcass of the poultry. A particularly suitable location for removing the intestines, and in particular the intestines and the gall bladder, from the viscera package is during the conveyance of the viscera package in the second conveyor.

In a preferred embodiment, the carcass conveyor member comprises a hook for carrying at least one leg of the carcass.

In a first preferred embodiment, the viscera package conveyor member comprises a clamping device for carrying the viscera package. The clamping device comprises, for example, two jaw parts which are pressed together by preloading and are adapted, for example, to clamp an organ or a part thereof, for example the oesophagus of the viscera package. In another preferred embodiment, the viscera package conveyor member comprises a gap or recess for carrying the viscera package. An organ, such as the oesophagus, or a tissue connection between organs is placed in the gap or recess, the organ or connecting tissue being deformed in the process. In yet another preferred embodiment, the viscera package conveyor member comprises one or more pointed projections for boring through an organ and carrying the viscera package by means of the projection(s). The projection(s) may, for example, be arranged on one of two jaw parts which are pressed towards one another under preloading, the projection(s) extending between the jaw parts.

The claims and advantages will be more readily appreciated as the same becomes better understood by reference to the following detailed description and considered in connection with the accompanying drawings in which like reference symbols designate like parts.

BRIEF DESCRIPTION OF THE DRAWINGS

FIG. 1 diagrammatically shows a top view of a first embodiment of a section of a slaughter line in a slaughterhouse;

FIG. 2 diagrammatically shows a top view of another embodiment of a section of a slaughter line in a slaughterhouse;

FIG. 8 shows a perspective view of a first embodiment of a carcass conveyor member coupled to a viscera package conveyor member;

FIG. 9 shows a perspective view of a second embodiment of a carcass conveyor member coupled to a viscera package conveyor member;

DESCRIPTION OF THE PREFERRED EMBODIMENTS

Figure 3:
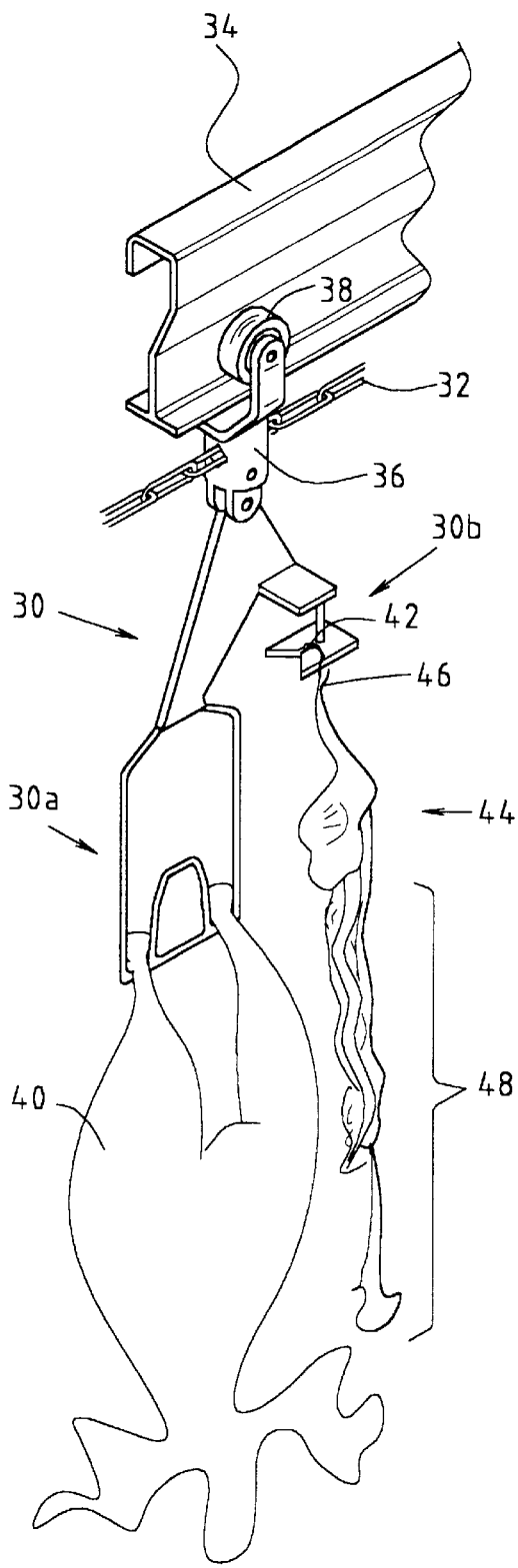
FIG. 3 shows a perspective view of a first embodiment of a combined conveyor member according to the invention.

In the various Figures, identical reference numerals relate to identical parts or parts which have an identical function. Arrows indicate the direction of movement of parts.

FIG. 1 shows an endless conveyor 2, denoted by a solid line, an endless conveyor 4 denoted by a dashed line, and an endless conveyor 6 denoted by a dashed line. In that section of the conveyor 2 which is denoted by 2a, birds are attached, stunned, exsanguinated, plucked and decapitated in various processing stations 8, which are indicated only by way of example. The birds processed in this way then pass through a eviscerating device 10, which is known per se and in which the viscera are removed from the bird, detached from the bird and transferred to the conveyor 4. A device 12 for removing intestines/gall bladder, which is known per se, is incorporated in the path of the conveyor 4, which device removes the intestines and the gall bladder from the viscera package. The viscera packages processed in this way are conveyed to that part of the conveyor 4 which is denoted by 4a. On the other hand, the carcasses from which the viscera packages have been removed, after passing through the eviscerating device 10, are conveyed to that section of the conveyor 2 which is denoted by 2b. While moving through the region 4a of the conveyor 4, the viscera packages, from which the intestines and gall bladder have been removed, are transferred, in a manner which is not shown in more detail, to the conveyor 2, the conveying speeds of the conveyors 2 and 4 and the conveying paths of the conveyors 2 and 4 from the location where the carcass and the viscera package are separated from one another being selected in such a manner that in the region 4a of the conveyor 4 the viscera package moves into an accurately defined position with respect to the carcass in the region 2b of the conveyor 2. The viscera package conveyed in the conveyor 2 and the associated carcass are then inspected by inspectors 14 in the region 2c of the conveyor 2.

After inspection, the viscera packages are transferred from the conveyor 2 to the conveyor 6, along the path of which a number of processing stations, which are denoted by the numeral 16, are incorporated for processing the viscera package, in particular separating its organs.

After the inspection, the carcass is processed further along the path of the conveyor 2 in processing stations which are denoted by way of example by the numeral 18.

FIG. 1 shows how the viscera packages conveyed in the conveyor 4 are transferred to the conveyor 2, which conveys carcasses, so that both the viscera package and the carcass are conveyed by the conveyor 2, in particular during the inspection of the viscera package and the carcass. Obviously, it is also possible (although not shown in the drawing) to design another device, on the basis of analogy to the device shown in FIG. 1, in such a manner that carcasses are transferred from their conveyor to the conveyor for the viscera packages, and then to inspect the carcasses and viscera packages conveyed in one conveyor.

FIG. 2 shows a conveyor line in which carcasses in which the viscera are still present are fed from the region 2a to the eviscerating device 10, where the viscera packages are removed from the carcasses, whereupon the viscera packages are conveyed further by the endless conveyor 4. After passing through the eviscerating device 10, the carcasses, in a region 20a in the transfer device 20, which is indicated only diagrammatically, are transferred to an endless conveyor 22. After passing through the device 12 for removing intestines/gall bladder, the viscera packages, in the region denoted by 20b in the transfer device 20, are transferred to the conveyor 22. In the conveyor 22, the carcasses and the associated viscera packages are conveyed past the inspectors 14 in the region 2c. The carcasses are then transferred back to the conveyor 2 in a transfer device 24, after which the carcasses are conveyed through processing stations 18 in order to undergo further processing operations. The viscera packages situated in the conveyor 22 are transferred to the conveyor 6 by a transfer device 26, in order to undergo further processing operations on moving through the processing stations 16.

It should be noted that both in FIG. 1 and in FIG. 2 the device 12 does not form an essential component of the conveyor line, and if desired this device can be omitted.

The conveyor 2 in FIG. 1 and the conveyor 22 in FIG. 2 may comprise combined conveyor members of the type shown in FIGS. 3–7.

The combined conveyor member 30 shown in FIG. 3 is moved along a rail 34, which is substantially in the form of an inverted J, with the aid of a chain 32. The conveyor member 30 comprises a substantially Y-shaped trolley 36 with two running wheels 38 which are able to roll along the lower, inverted T-shaped section of the rail 34. The combined conveyor member 30 comprises a carcass conveyor member 30a in the form of a double hook, from which the legs of a carcass 40 can be suspended, and furthermore comprises a viscera package conveyor member 30b, with a slot 42 in which a (part of an) organ or connecting tissue between organs of a viscera package 44 is held.

In FIG. 3 and the following figures, the viscera package 44 is always suspended by the oesophagus 46 thereof. That portion of the viscera package 44 which is denoted by reference numeral 48 is absent if at least the intestines, and in particular the intestines and the gall bladder, have been removed in or outside the carcass, for example by means of a device 12 for removing intestines/gall bladder, as shown in FIGS. 1 and 2. In the conveyor member 30, the carcass 40 is coupled to the viscera package 44, and the viscera package hangs next to the carcass 40, when seen from a direction which is perpendicular to the longitudinal direction of the rail 34.

Figure 4:
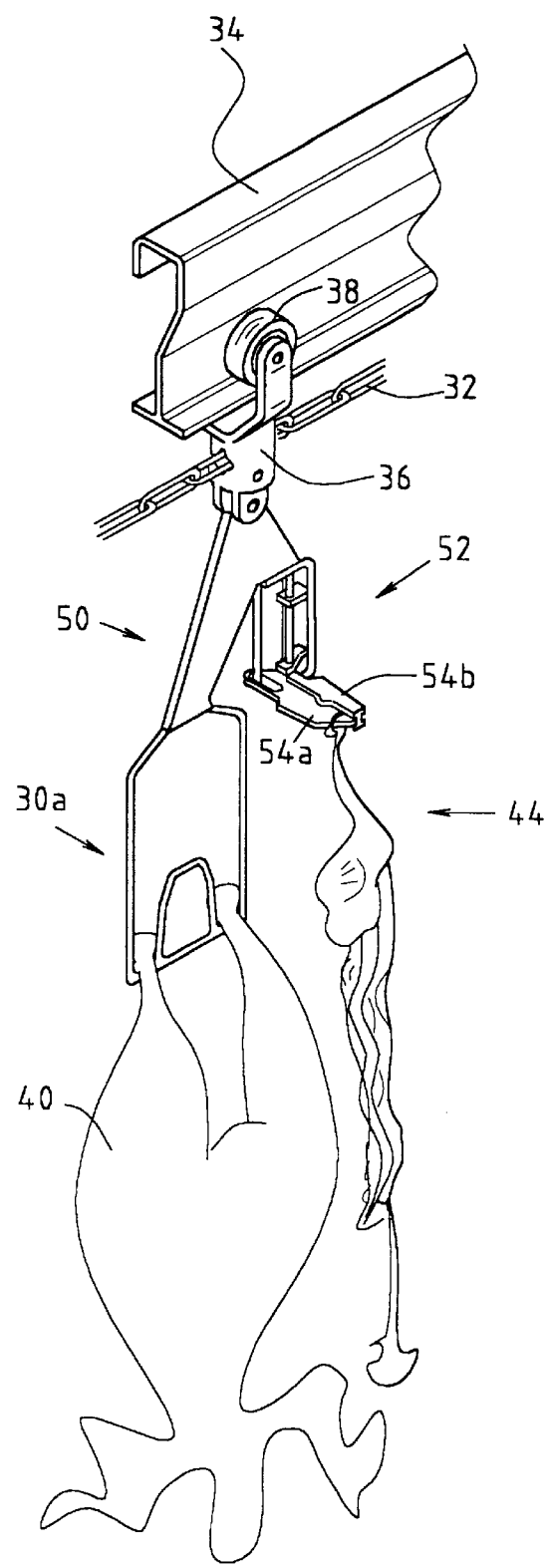
FIG. 4 shows a perspective view of a second embodiment of a combined conveyor member according to the invention.

The conveyor member 50 in accordance with FIG. 4 is constructed substantially in the same way as the conveyor member 30 in accordance with FIG. 3, with the exception of the viscera package conveyor member 52, which in FIG. 4 is designed as two jaw parts 54a and 54b, which can move away from and towards one another and are able to fixedly clamp a (part of an) organ or connecting tissue between organs, by virtue of a preloading, which is produced in the viscera package conveyor member in a manner not shown in more detail and forces the jaw parts 54a and 54b towards one another. In FIG. 4, as in FIG. 3, the viscera package 54 hangs next to the carcass 40, when seen from a direction which is perpendicular to the longitudinal direction of the rail 34.

Figure 5:
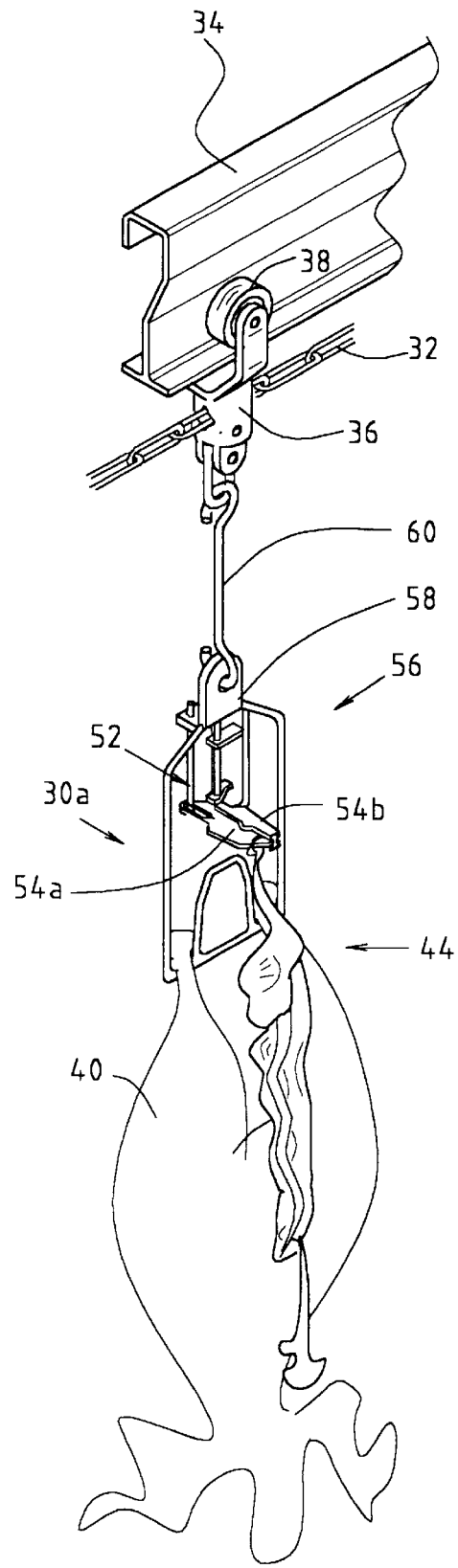
FIG. 5 shows a perspective view of a third embodiment of a combined conveyor member according to the invention.

The combined conveyor member 56 shown in FIG. 5 comprises a carcass conveyor member in the form of the double hook 30a and the viscera package conveyor member 52 with the clamping jaw parts 54a and 54b. The carcass conveyor member 30a and the viscera package conveyor member 52 are both attached to a perforated lip 58 and are suspended from the trolley 36 with the aid of a double hook 60. The viscera package 44 hangs in front of the carcass 40, when seen from the direction which is perpendicular to the longitudinal direction of the rail 34.

Figures 6, 7:
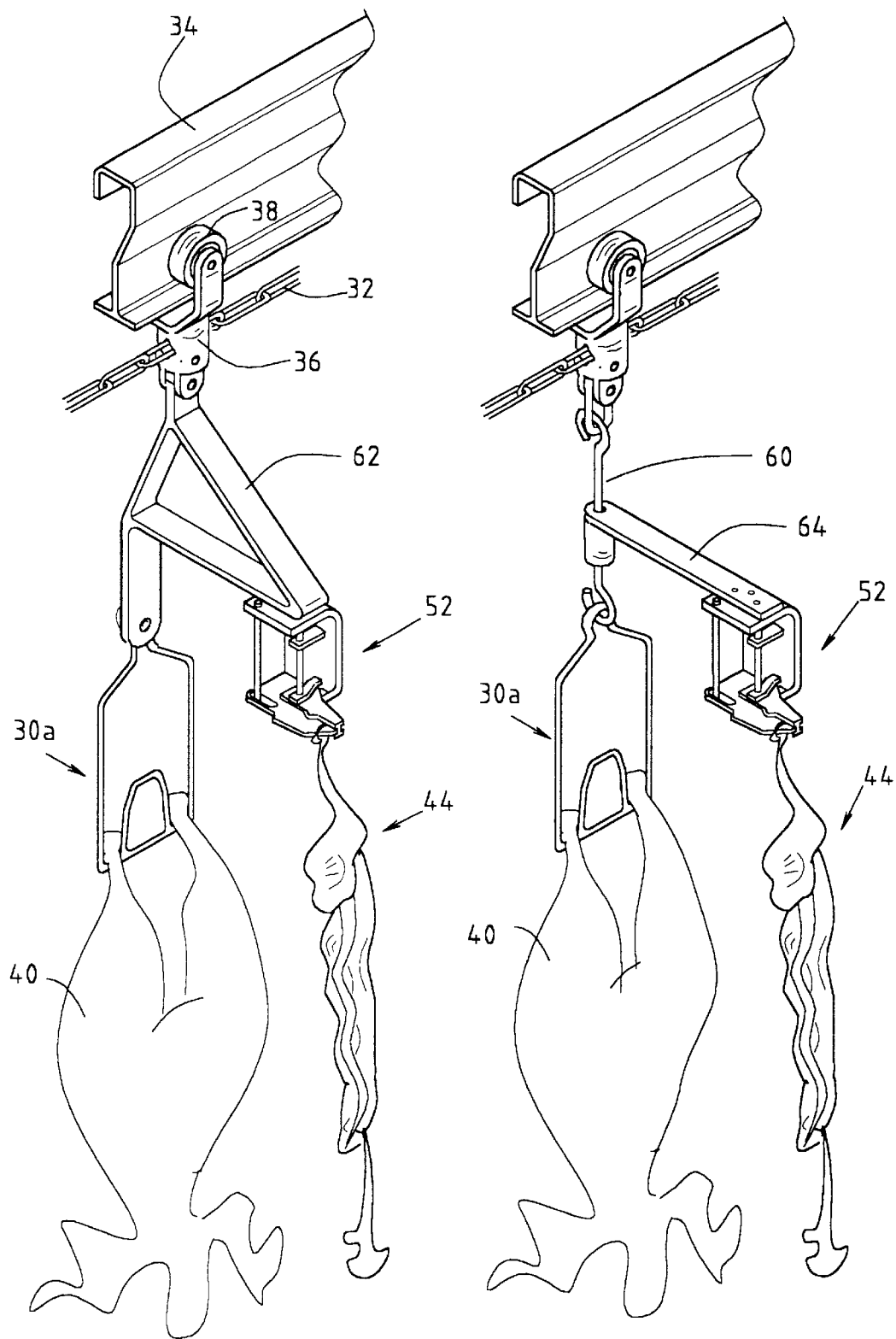
FIG. 6 shows a perspective view of a fourth embodiment of a combined conveyor member according to the invention.
FIG. 7 shows a perspective view of a fifth embodiment of a combined conveyor member according to the invention.

The same situation applies in FIGS. 6 and 7. However, in FIG. 6, the carcass conveyor member 30a is coupled to the viscera package conveyor member 52 by means of a substantially P-shaped bracket 62, with the result that the distance between the viscera package 44 and the carcass 40 is greater than that in FIG. 5. The distance between the carcass 40 and the viscera package 44 in FIG. 7 is also greater than that in FIG. 5, owing to the use of a transverse arm 64, via which the viscera package conveyor member is coupled to the double hook 60. The relatively great distance between the carcass 40 and the viscera package 44 in the combined conveyor members in accordance with FIGS. 6 and 7 makes it easy to inspect both the carcass 40 and the viscera package 44.

FIG. 8 shows a combined conveyor member which is composed of a carcass conveyor member 30a and a viscera package conveyor member 52, which are coupled together by means of a chain 66, and can each be advanced along the rail 34, by means of the chain 32, via their own trolley 36 with running wheels 38. Thus the viscera package 44 hangs next to the carcass 40, when seen from a direction which is perpendicular to the longitudinal direction of the rail 34.

FIG. 9 shows a similar mutual arrangement of the carcass conveyor member 30a and a viscera package conveyor member 68 to that shown in FIG. 8. The viscera package conveyor member 68 comprises two arms 68a and 68b, which are pivotably fastened to the trolley 36, in the region beneath the latter, the free end of the arm 68b being provided with a number of pointed projections 70, which extend towards the free end of the arm 68a. The arms 68a and 68b are pressed towards one another under preloading in a manner which is not shown in more detail, so that part of the viscera package 44 is at least partially bored through by the pointed projections 70, thus supporting the viscera package 44.

Figure 10:
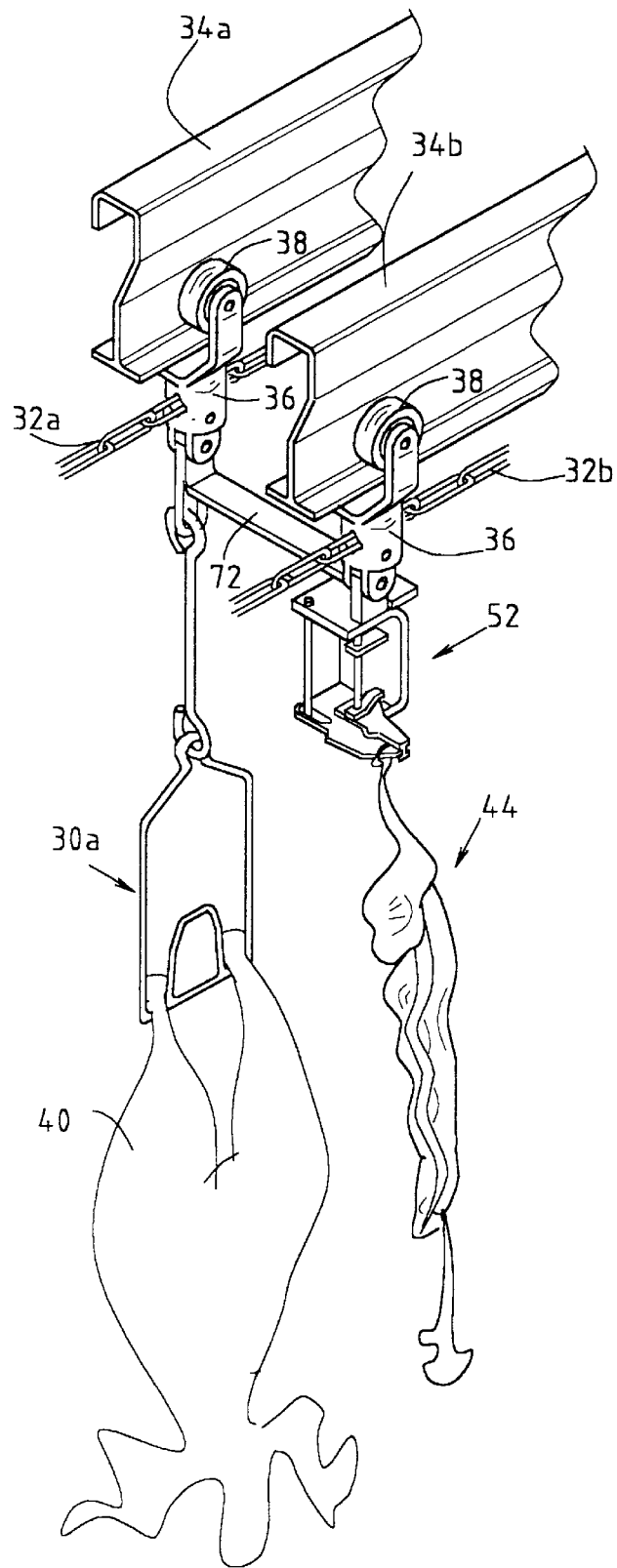
FIG. 10 shows a perspective view of a third embodiment of a carcass conveyor member coupled to a viscera package conveyor member.

FIG. 10 shows two parallel rails 34a, 34b, the rail 34a carrying the carcass conveyor member 30a which is advanced along the rail 34a by means of chain 32a, and the rail 34b carrying the viscera package conveyor member 52 which is advanced along the rail 34b by means of chain 32b. A coupling, in the form of a bar 72, is arranged between the carcass conveyor member 30a and the viscera package conveyor member 52. The bar 72 is fixedly connected to the trolley 36 of the carcass conveyor member 30a, and at its free end advances the trolley 36 of the viscera package conveyor member 52.

Figure 11:
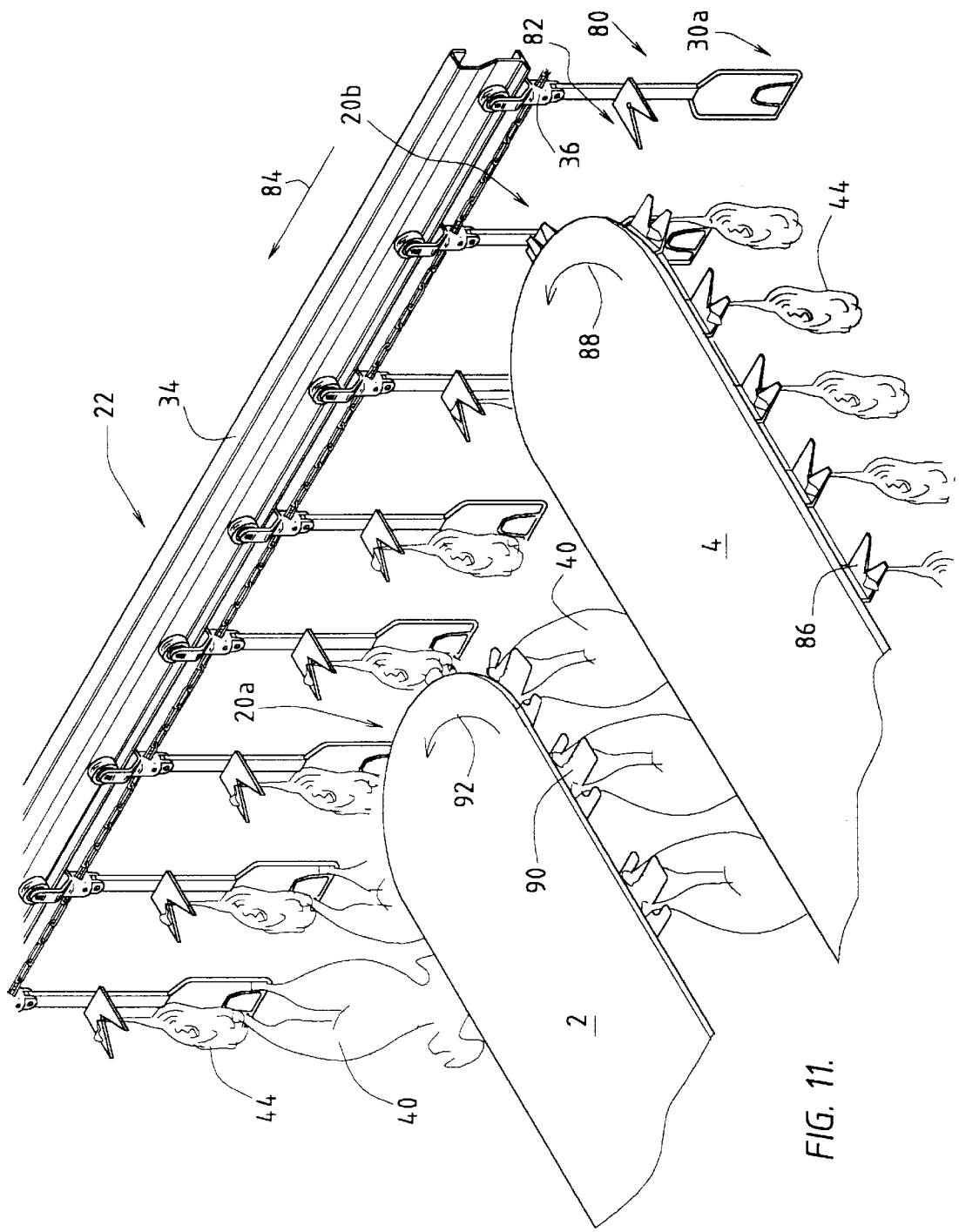
FIG. 11 shows a perspective view of a first conveyor for conveying carcasses, a second conveyor for conveying viscera, a third conveyor for conveying carcasses and viscera and a transfer device.

FIG. 11 shows an embodiment of the transfer device in accordance with FIG. 2. Combined conveyor members 80, which comprise a carcass conveyor member 30a and a viscera package conveyor member 82, are moved along the rail 34 in the direction of arrow 84 and form a section of the conveyor 22 in accordance with FIG. 2. In the conveyor 4, viscera packages 44, which are hanging in a recess in viscera package conveyor members 86, are advanced in the direction of arrow 88. In the conveyor 2, carcasses 40, with the legs hanging in recesses in plate-shaped carcass conveyor members 90, are advanced in the direction of arrow 92.

In the region 20b, the recesses of the viscera package conveyor members 82 and 86 are brought into alignment with one another, and the organ situated in the recess of the viscera package conveyor member 82 is pressed tightly, with the aid of mechanical guides which are not shown in more detail, so that the viscera packages 44 are thus transferred from the conveyor 4 to the conveyor 22. In the region 20a, the carcasses 40 are transferred from the carcass conveyor members 90 of the conveyor 2 to the carcass conveyor members 30a of the conveyor 22, in a manner which is not shown in more detail. Consequently, after passing through the region 20a, the combined conveyor member 80 contains both carcasses 40 and viscera packages 44, the synchronization between the conveyors 2, 4 and 22 being such that each conveyor member 80 holds the viscera package 44 which originated from the carcass 40 suspended in the same conveyor member 80.

Figure 12:
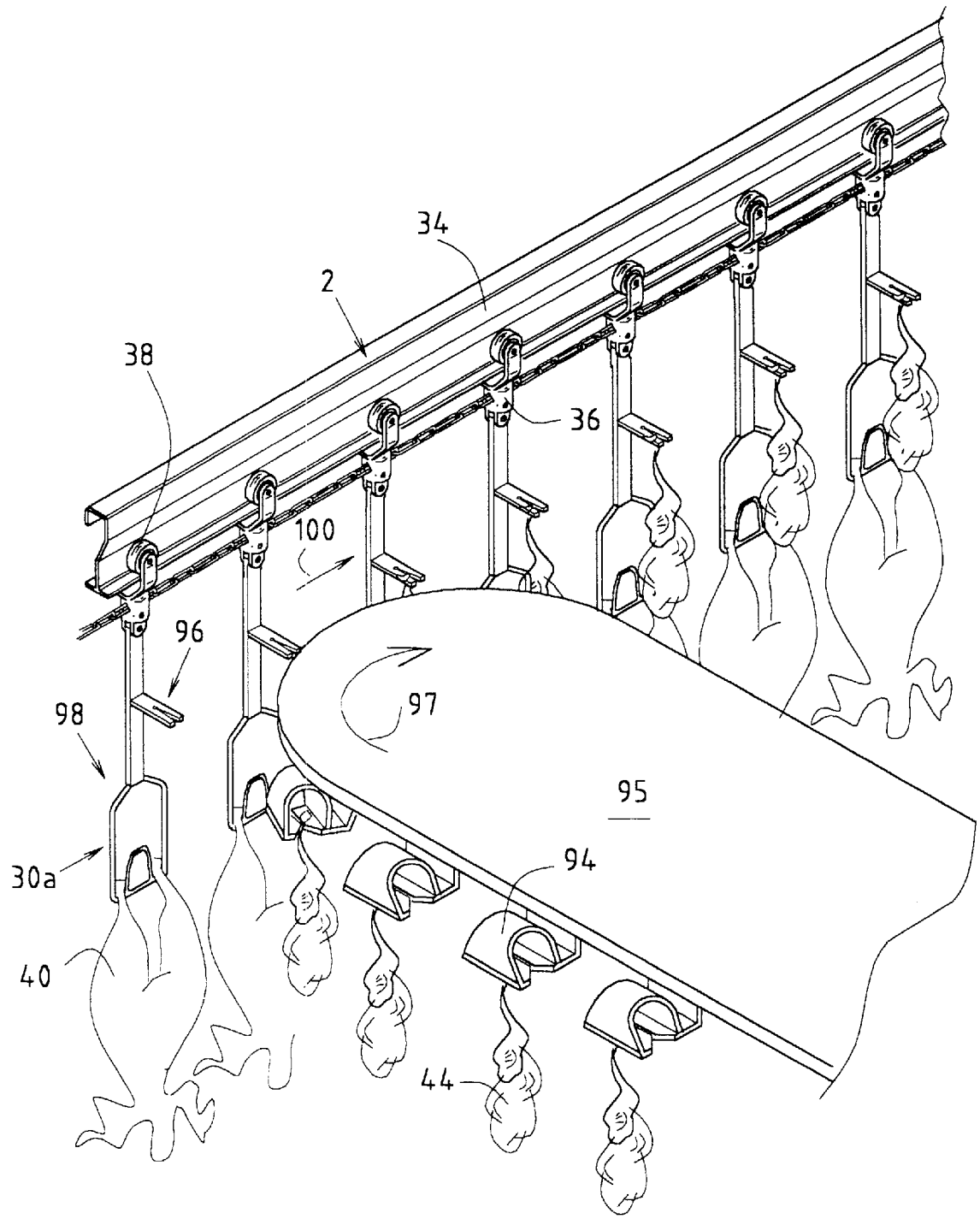
FIG. 12 shows a perspective view of a first embodiment of a first conveyor for conveying carcasses, a second conveyor for conveying viscera packages, and a transfer device.

FIG. 12 illustrates the transfer, which is performed in a way which is not shown in more detail, of viscera packages 44, which are suspended in viscera package conveyor members 94 of a conveyor 95 moving in the direction of arrow 97, to viscera package conveyor members 96 of combined conveyor members 98 of a conveyor 2 moving in the direction of arrow 100, as shown for example in FIG. 1. Each viscera package conveyor member 94 comprises a slot which is open at both ends and in which an organ of the viscera package 44 can be held in order to support the viscera package 44.

Figure 13:
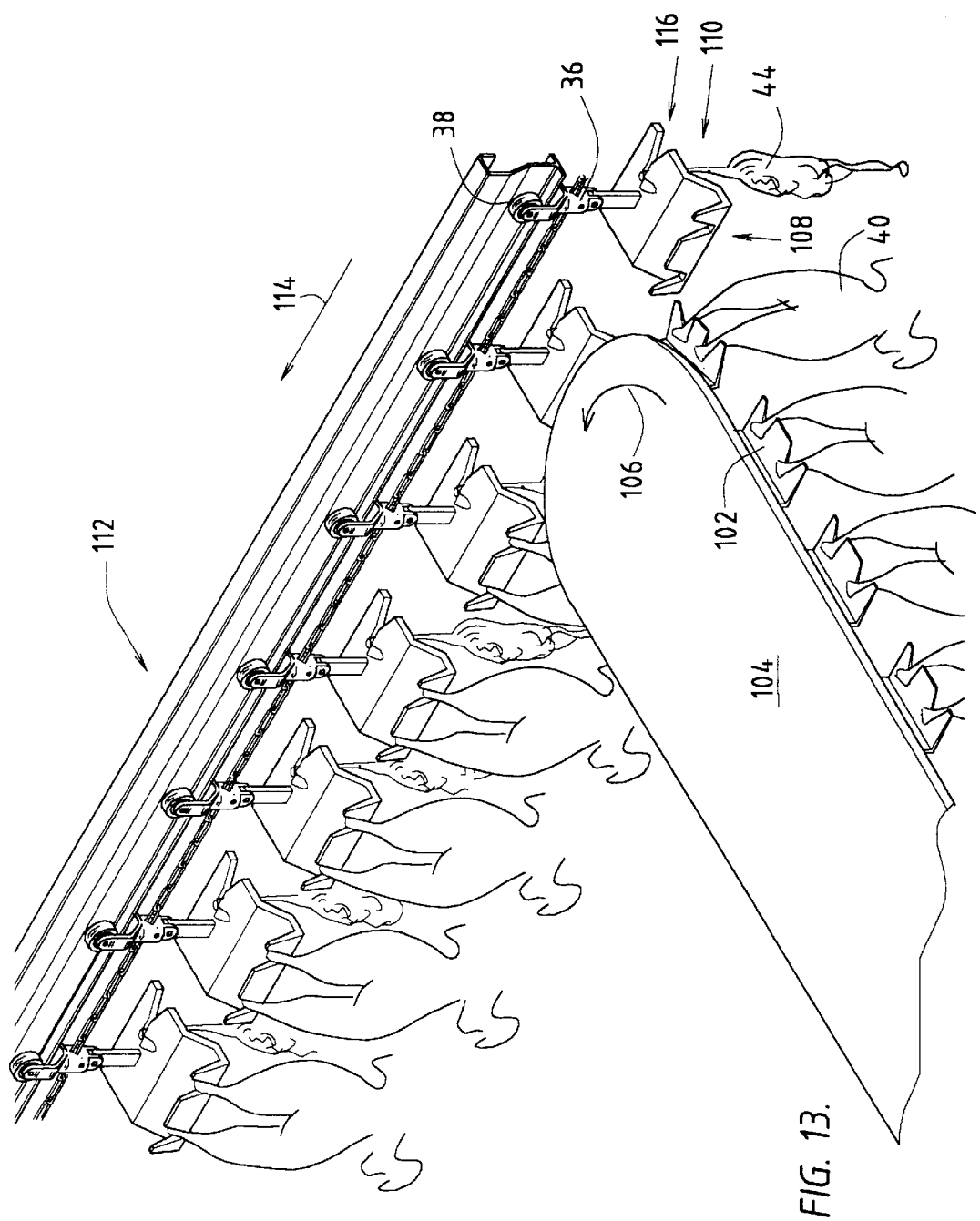
FIG. 13 shows a perspective view of a second embodiment of a first conveyor for conveying carcasses, a second conveyor for conveying viscera, and a transfer device.

FIG. 13 illustrates how carcasses 40 suspended in carcass conveyor members 102 of a conveyor 104 moving in the direction of arrow 106 are transferred, in a manner not shown in more detail, to carcass conveyor members 108 of combined conveyor members 110 which are advanced in a conveyor 112 in the direction of arrow 114. The combined conveyor member 110 comprises a viscera package conveyor member 116 with a slot for accommodating the oesophagus of the viscera package 44.

Figure 14:
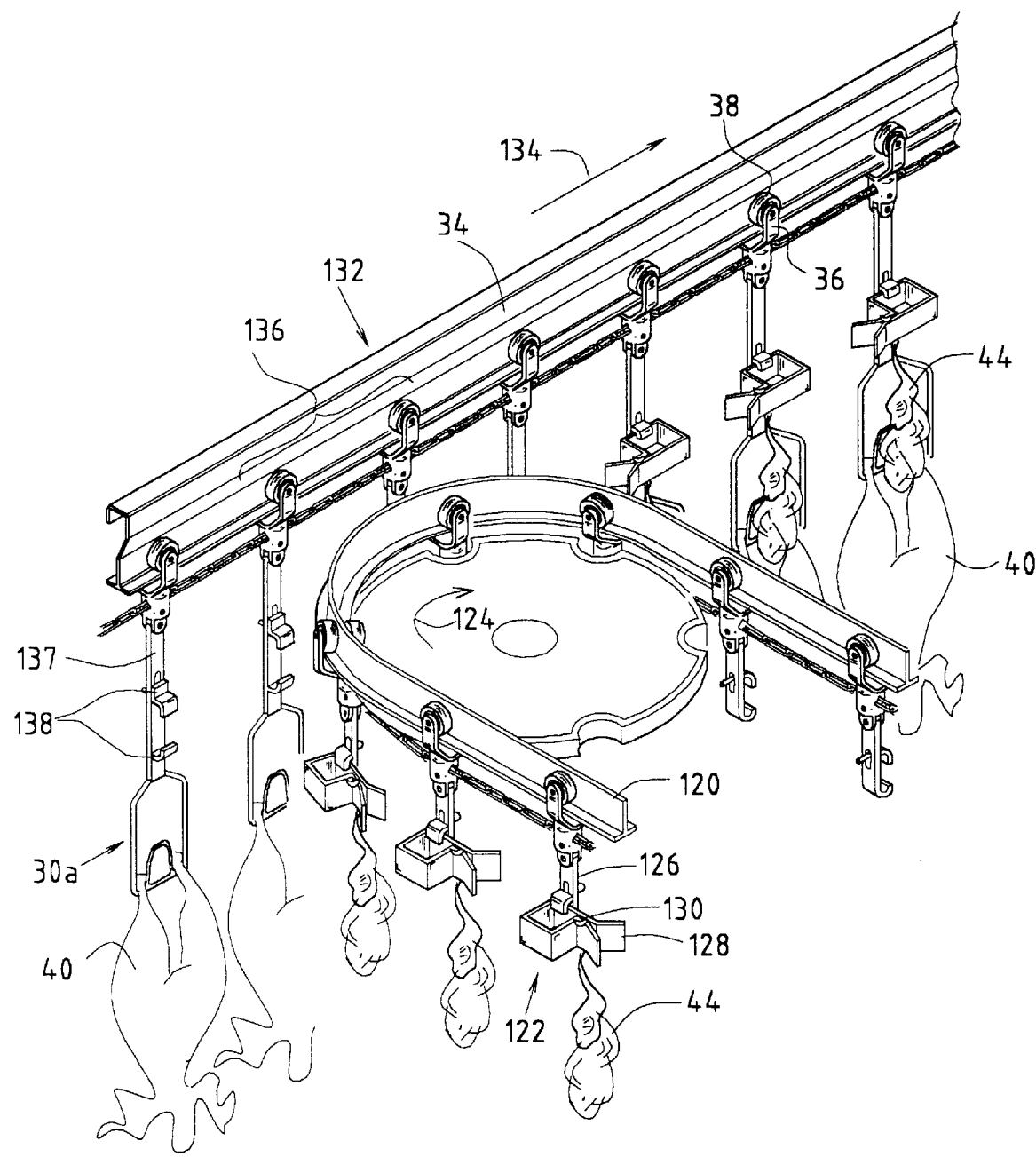
FIG. 14 shows a perspective view of a third embodiment of a first conveyor for conveying carcasses, a second conveyor for conveying viscera, and a transfer device.

FIG. 14 shows a conveyor 120, in which viscera package conveyor members 122 are advanced in the direction of arrow 124. The viscera package conveyor members 122 comprise an arm 126, from which a bracket 128 is suspended in a detachable manner, which bracket comprises a gap 130 in which an organ of the viscera package 44 can be held in order to carry the viscera package 44.

FIG. 14 furthermore shows a conveyor 132, in which carcass conveyor members 30a with carcasses 40, which are on the left-hand side of the figure, are advanced in the direction of arrow 134. In region 136, the brackets 128 of the viscera package conveyor members 122 are transferred, in a manner which is not shown in more detail, to the conveyor 132, these brackets being clamped fixedly between hooks 138 which can be moved longitudinally along a strip 137. In this way, the viscera package conveyor member 122, together with the viscera package 44 suspended therefrom, is transferred from the conveyor 120 to the conveyor 132.

Figure 14A:
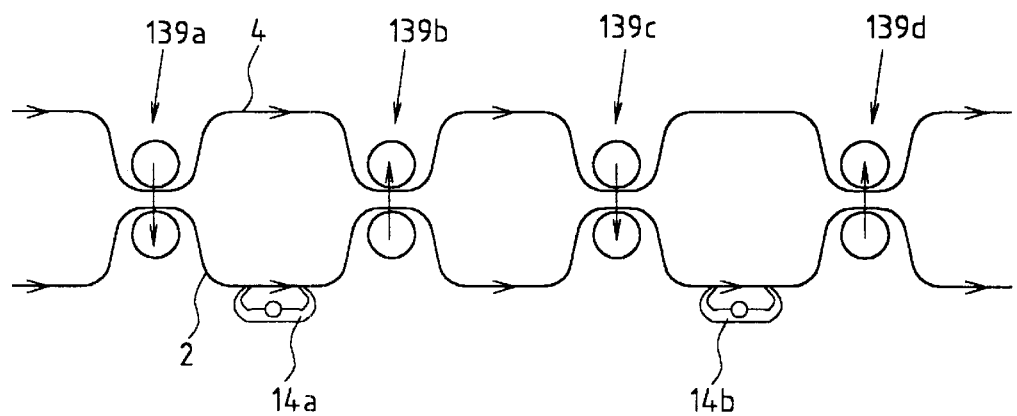
FIG. 14a diagrammatically shows a top view of a section of a slaughter line in a slaughterhouse.
Figure 14B:
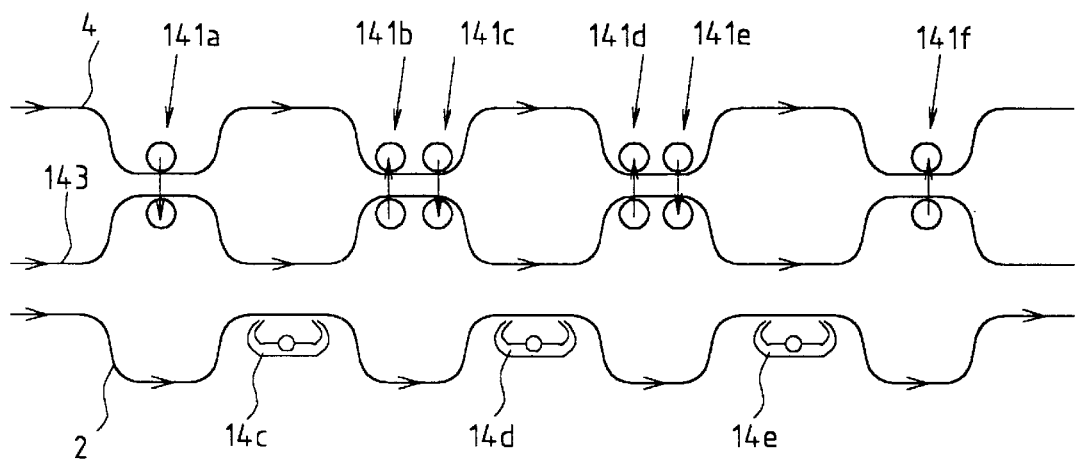
FIG. 14b diagrammatically shows a top view of a section of another slaughter line in a slaughterhouse.

In the particular inspection situation in which a conveyor, such as the conveyor 34 from FIG. 12 or the conveyor 132 from FIG. 14, conveys such a large number of carcasses past an inspector per unit time that the inspector is unable to inspect all the carcasses on his/her own, it is possible to make provisions so that, from the conveyor for viscera packages 95 (FIG. 12) or 120 (FIG. 14), the associated viscera package is not suspended from the combined conveyor member, from which the carcass is already hanging, for every carcass; rather, depending on the throughput capacity of the conveyor in relation to the inspection rate which the inspector is able to accomplish, the associated viscera package for every second, third, fourth, etc., carcass is transferred from the viscera package conveyor, the inspector inspecting the carcasses and viscera packages only when they are suspended together in one combined conveyor member. For the purpose of an inspection at another inspector, toghether with other carcasses, the associated viscera packages can then be suspended until ultimately, by proceeding in this way, all carcasses and viscera packages have been inspected. FIG. 14a and 14b illustrate a slaughter line in which the inspection method described above is used.

In FIG. 14a, transfer devices 139a and 139c are provided, which are able to transfer viscera packages from viscera package conveyor 4 to conveyor 2 with combined conveyor members from which carcasses are hanging, and transfer devices 139b and 139d are also provided, which transfer viscera packages back from conveyor 2 to conveyor 4. It is assumed that the conveyors 2 and 4 are moving at speeds which are such that approximately twice as many carcasses pass by inspectors 14a, 14b as they are able to inspect. Now, at the location of the transfer device 139a, the viscera package associated with every second carcass conveyed in the conveyor 2 are transferred from the conveyor 4 to the conveyor 2. The inspector 14a then inspects only the viscera packages and carcasses which are hanging together in a combined conveyor member of the conveyor 2; the carcasses which are advanced in the conveyor 2 without associated viscera package are not inspected by the inspector 14a. Rejected viscera packages and/or carcasses are removed from the conveyor 2 by the inspector 14a. The viscera packages approved by the inspector 14a are transferred back, by means of the transfer device 139b, to the conveyor 4, where they move back between the viscera packages which have not yet been inspected. The viscera packages which have not yet been inspected are then transferred, at the location of the transfer device 139c, from the conveyor 4 to the combined conveyor member of the conveyor 2, which is conveying the associated carcass. The inspector 14b then inspects only the viscera packages and carcasses which are hanging together in a combined conveyor member of the conveyor 2; the carcasses which are advanced past the inspector 14b without associated viscera package in the conveyor 2 have already been inspected and approved by the inspector 14a. Rejected viscera packages and/or carcasses are removed from the conveyor 2 by the inspector 14b. The viscera packages approved by the inspector 14b are transferred back, by means of the transfer device 139d, to the conveyor 4, where they move back between the viscera packages which have already been inspected and approved. In this way, all the carcasses and viscera packages supplied at the left-hand side of FIG. 14a, via the conveyors 2 and 4, by the right-hand side of FIG. 14a have been inspected, after passing the transfer devices 139a–139d and the inspectors 14a and 14b, each inspector 14a, 14b inspecting half the total quantity of carcasses and viscera packages at half the rate of the conveyors. In a similar way, if more than two inspectors are employed, it is possible to set even higher slaughter-line rates if the configuration of the slaughter line is adapted accordingly.

In FIG. 14b, transfer devices 141a, 141c and 141e are provided, which are able to transfer viscera packages from viscera package conveyor 4 to intermediate conveyor 143, and transfer devices 141b, 141d and 141f are provided, which transfer viscera packages back from intermediate conveyor 143 to conveyor 4. The conveyor 2 conveys carcasses. It is assumed that the conveyors 2, 4 and 143 are moving at rates which are such that approximately three times as many carcasses pass inspectors 14c, 14d and 14e as they are able to inspect. Now, at the location of the transfer device 141a, every third viscera package is transferred from the conveyor 4 to the intermediate conveyor 143. The inspector 14c then inspects only the viscera packages and carcasses which belong with one another and are moved past him by the intermediate conveyor 143 and conveyor 2, respectively. The carcasses which are advanced without associated viscera package in the conveyor 2 are not inspected by the inspector 14c. Rejected viscera packages and/or carcasses are removed from the conveyors 143 and 2, respectively, by the inspector 14c. The viscera packages approved by the inspector 14c are transferred back, by means of the transfer device 141b, to the conveyor 4, where they move back between the viscera packages which have not yet been inspected. Then, of the viscera packages which have not yet been inspected, every second viscera package is transferred, at the location of the transfer device 141c, from the conveyor 4 to the intermediate conveyor 143. The inspector 14d then inspects only the viscera and carcasses which belong with one another and are moved past him by the conveyor 143 and 2, respectively. Every second one of the carcasses which are moved past the inspector 14d in the conveyor 2 without associated viscera package has already been inspected by the inspector 14c. Rejected viscera packages and/or carcasses are removed from the conveyors 143 and 2, respectively, by the inspector 14d. The viscera packages approved by the inspector 14d are transferred back, by means of the transfer device 141d, to the conveyor 4, where they move back between viscera packages which have already been inspected and viscera packages which have not yet been inspected. The viscera packages which have not yet been inspected are then transferred, at the location of the transfer device 141e, from the conveyor 4 to the intermediate conveyor 143. The inspector 14e then inspects only the viscera packages and carcasses which belong with one another and are moved past him by the conveyors 143 and 2, respectively; the carcasses which are advanced past the inspector 14e without associated viscera package in the conveyor 2 have already been inspected and approved by the inspectors 14c and 14d. Rejected viscera packages and/or carcasses are removed from the conveyors 143 and 2, respectively, by the inspector 14e. The viscera packages approved by the inspector 14e are transferred back, by means of the transfer device 141f, to the conveyor 4, where they move back between the other viscera packages which have already been inspected and approved. In this way, all the carcasses and viscera packages supplied at the left-hand side of FIG. 14b, via the conveyors 2 and 4, by the right-side of FIG. 14b have been inspected, after passing the transfer devices 141a–141f and the inspectors 14c, 14d and 14e, each inspector 14c, 14d and 14e inspecting one third of the total quantity of carcasses and viscera packages at one third of the rate of the conveyors. In general, the intermediate conveyor 143 will be designed as an endless conveyor; FIG. 14b shows only the advancing section of this conveyor, and not the returning section.

Obviously, depending on the configuration of the conveyors used, provisions may be made in the arrangements of FIG. 14a and 14b to remove carcasses and/or viscera packages which have already been inspected from the relevant conveyors by means of suitable transfer devices prior to an inspection by a following inspector.

Obviously, it is also possible to use the conveyor 2 of FIGS. 14a and 14b to convey not carcasses but viscera packages, and to use the conveyor 4 of FIGS. 14a and 14b to convey not viscera packages but carcasses. The advantages which can be achieved (high slaughter-line rates at normal inspection rates) are thus retained. It should furthermore be noted that in the slaughter line arrangements in accordance with FIGS. 14a and 14b, instead of transferring viscera packages or carcasses with the aid of the transfer devices 139a–139d and 141a–141f, it is also possible to transfer viscera package conveyor members with viscera packages and carcass conveyor members with carcasses.

In the slaughter line arrangement in accordance with FIG. 14b, the viscera package conveyor members and carcass conveyor members may be coupled together during the inspection, but it is also possible to do without such coupling.

Figure 15:
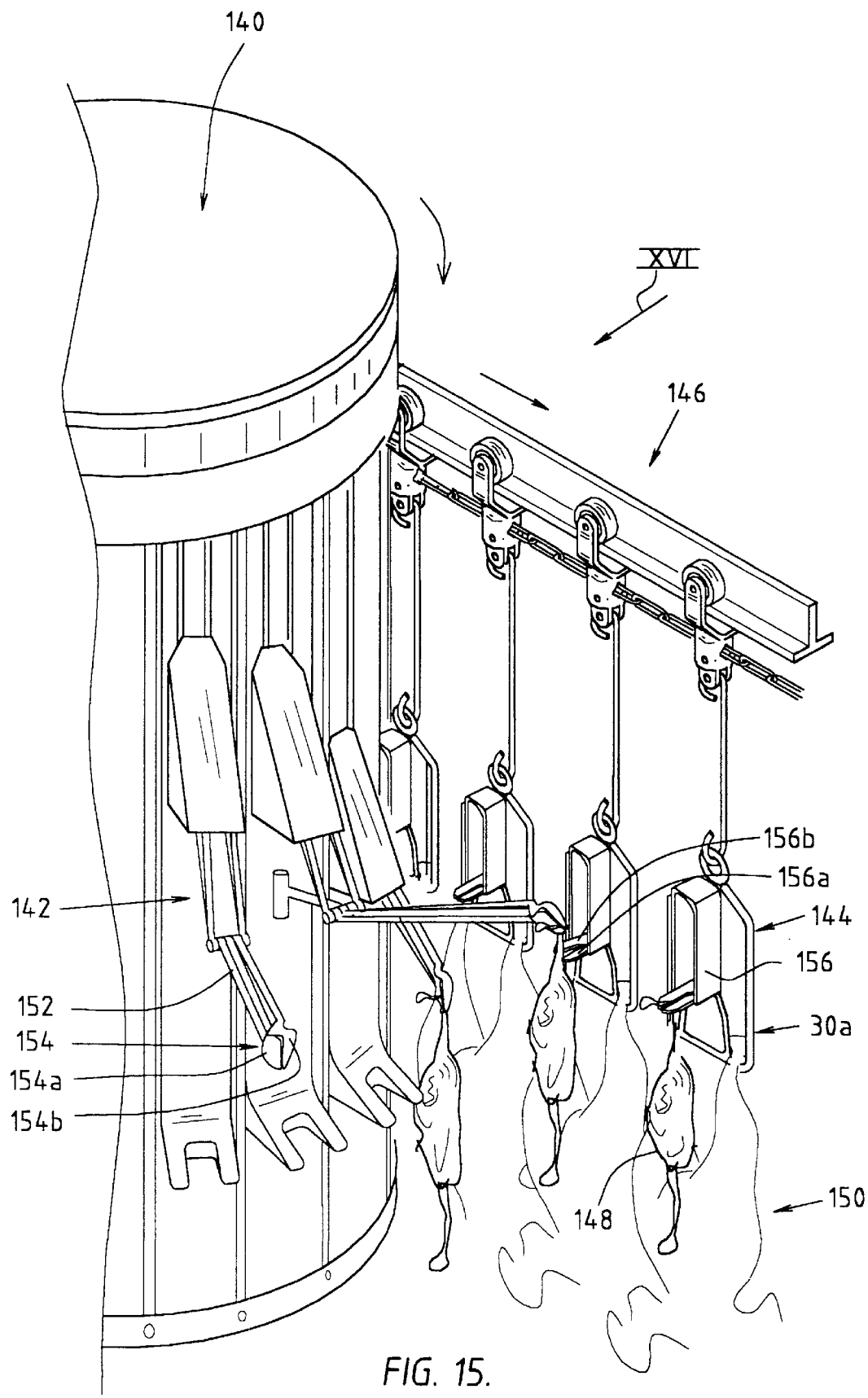
FIG. 15 shows a perspective view of a drawing and separating device, interacting with a conveyor with combined conveyor members.

FIG. 15 shows an eviscerating and separating device 140 of roundabout design, in which a number of processing units 142 are arranged moveably and controllably in such a manner that they move synchronously with carcasses 150 hung in combined conveyor members 144 of a conveyor 146, in order to remove viscera packages 148 from these carcasses 150 and to detach the viscera packages 148 from the carcasses 150. The processing units 142 comprise a controllably moveable arm 152, with a gripper member 154 at its free end. The combined conveyor members 144 comprise a carcass conveyor member 30a and a viscera package conveyor member 156 which comprises two jaw parts 156a and 156b, which can be moved with respect to one another, in a manner not shown in more detail, in order to move the jaw parts 156a and 156b away from one another and towards one another. The gripper member 154 comprises two jaw parts 154a and 154b, which can likewise be moved away from one another and towards one another in a manner which is not shown in more detail.

After drawing and separating the viscera package 148 from the carcass 150, the jaw parts 154a and 154b of the processing unit 142 fixedly clamp an organ of the viscera package 148, in the case shown an oesophagus. The arm 152 is then moved in such a manner that the oesophagus comes to hang between the jaw parts 156a and 156b of the viscera package conveyor member 156, after which the jaw parts 156a and 156b are moved towards one another in order to fixedly clamp the oesophagus. The jaw parts 154a and 154b are then opened. The viscera package 148 is thus transferred to the viscera package conveyor member 156 of the combined conveyor member 144 immediately after it has been drawn from the carcass and the viscera package has been separated from the carcass. The combined conveyor member is then guided through an inspection station, which is not shown in the figure, in order for the carcass and the viscera package to be inspected.

Figure 16:
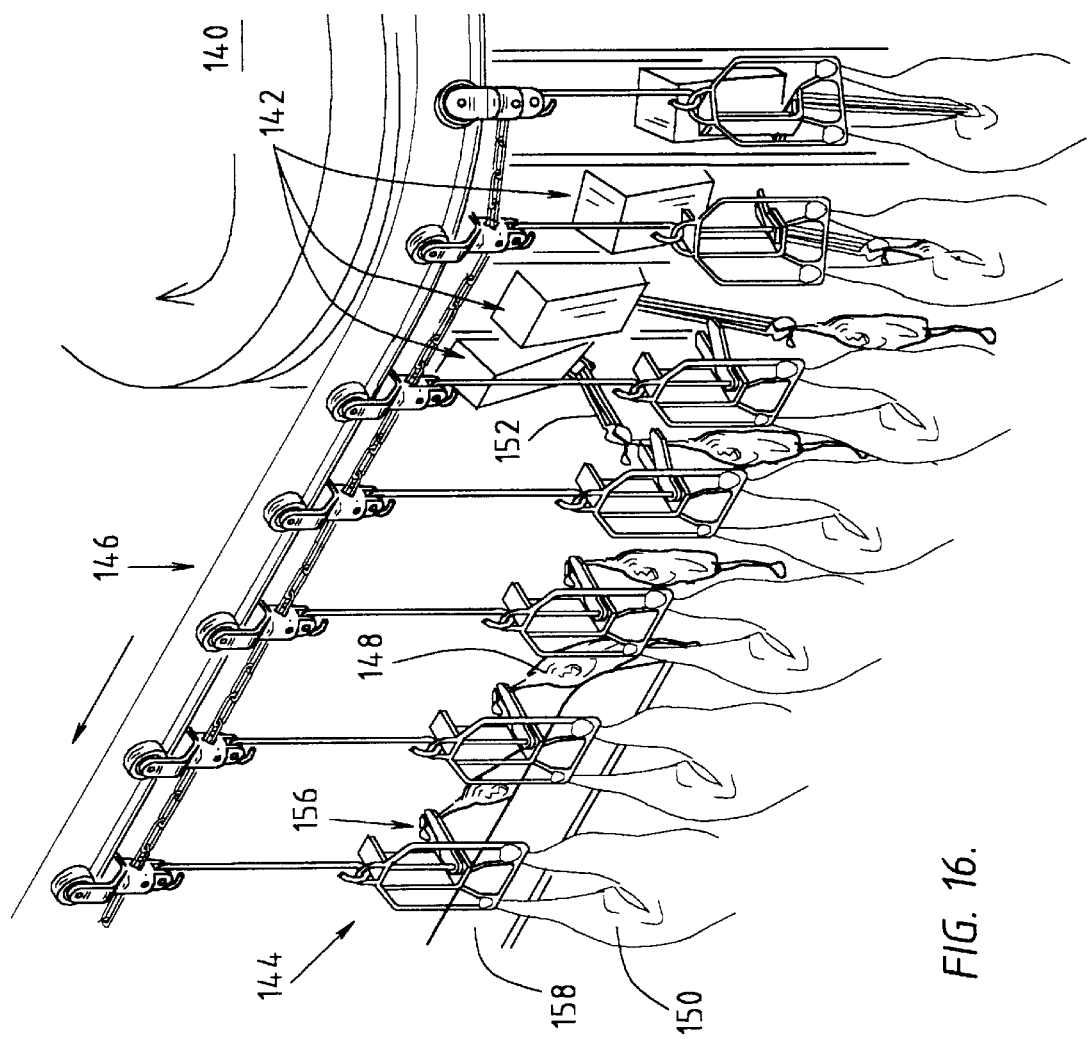
FIG. 16 shows a perspective view of the device shown in FIG. 15, in the direction of arrow XVI.

FIG. 16 shows a similar arrangement to that shown in FIG. 15, but in this case a separating element 158, which is directed parallel to the conveying direction of the conveyor 146, is arranged in the path between the eviscerating and separating device 140 and a downstream inspection station, which is not shown in the figure, in order to hold the carcasses and the viscera packages 148 apart, due to the fact that they are each advanced on opposite sides of the separating element 158 by the combined conveyor member 144.

It will be clear that the above-described devices ensure reliable synchronization of the viscera package and the carcass in an inspection station, by means of a generally mechanical coupling between the viscera package conveyor member and the carcass conveyor member.

The transfer of viscera packages and carcasses, which is not described in more detail above, is carried out by means of transfer devices which are generally known, and are therefore not shown and described in detail.

While the invention has been described and illustrated in its preferred embodiments, it should be understood that departures may be made therefrom within the scope of the invention, which is not limited to the details disclosed herein.

What is claimed is:

1. A method for processing slaughtered poultry, comprising the following steps:
   drawing a viscera package out of a carcass of the poultry;
   separating the viscera package from the carcass;
   conveying the viscera package in a viscera package conveyor member;
   conveying the carcass in a carcass conveyor member; and
   inspecting the viscera package and the carcass, wherein the viscera package conveyor member and the carcass conveyor member are coupled together by a coupling which moves together with the viscera package conveyor member and the carcass conveyor member at least during the inspection.

2. The method of claim 1, wherein the viscera package conveyor member and the carcass conveyor member form part of one combined conveyor member.

3. The method of claim 1, wherein after the viscera package has been drawn and separated the carcass is conveyed by a first conveyor and the viscera package is conveyed by a second conveyor, in that prior to the inspection the viscera package is transferred from the second conveyor to the first conveyor, and in that the inspection of the viscera package conveyed by the first conveyor and the carcass conveyed by the first conveyor then takes place.

4. The method of claim 3, wherein after the inspection the viscera package is transferred from the first conveyor to the second conveyor.

5. The method of claim 3, wherein during the conveyance of the viscera package in the second conveyor at least the intestines, and in particular the intestines and the gall bladder, are removed from the viscera package.

6. The method of claim 1, wherein after the viscera package has been drawn and separated the carcass is conveyed by a first conveyor and the viscera package is conveyed by a second conveyor, prior to the inspection the carcass is transferred from the first conveyor to the second conveyor, and the inspection of the viscera package conveyed by the second conveyor and the carcass conveyed by the second conveyor then takes place.

7. The method of claim 6, wherein after the inspection the carcass is transferred from the second conveyor to the first conveyor.

8. The method of claim 6, wherein during the conveyance of the viscera package in the second conveyor at least the intestines, and in particular the intestines and the gall bladder, are removed from the viscera package.

9. The method of claim 1, wherein after the viscera package has been drawn and separated the carcass is conveyed by a first conveyor and the viscera package is conveyed by a second conveyor, and prior to the inspection the viscera package is transferred from the second conveyor to a third conveyor and the carcass is transferred from the first conveyor to the third conveyor, and the inspection of the viscera package conveyed by the third conveyor and the carcass conveyed by the third conveyor then takes place.

10. The method of claim 9, wherein after the inspection the carcass and/or the viscera package is/are transferred from the third conveyor to the first or second conveyor, respectively.

11. The method of claim 9, wherein during the conveyance of the viscera package in the second conveyor at least the intestines, and in particular the intestines and the gall bladder, are removed from the viscera package.

12. The method of claim 1, wherein after the viscera package has been drawn and separated the carcass is conveyed by a first conveyor and the viscera package is conveyed by a second conveyor, and prior to the inspection the viscera package is transferred from the second conveyor to a third conveyor, and the inspection of the viscera package conveyed by the third conveyor and the carcass conveyed by the first conveyor then takes place.

13. The method of claim 12, wherein after the inspection the viscera package is transferred from the third conveyor to the second conveyor.

14. The method of claim 12, wherein during the conveyance of the viscera package in the second conveyor at least the intestines, and in particular the intestines and the gall bladder, are removed from the viscera package.

15. The method of claim 1, wherein after the viscera package has been drawn and separated the carcass is conveyed by a first conveyor and the viscera package is conveyed by a second conveyor, and prior to the inspection the carcass is transferred from the first conveyor to a third conveyor, and the inspection of the viscera package conveyed by the second conveyor and the carcass conveyed by the third conveyor then takes place.

16. The method of claim 15, wherein after the inspection the carcass is transferred from the third conveyor to the first conveyor.

17. The method of claim 15, wherein during the conveyance of the viscera package in the second conveyor at least the intestines, and in particular the intestines and the gall bladder, are removed from the viscera package.

18. The method of claim 3, wherein the transfer of the viscera package and/or the carcass takes place together with the associated viscera package conveyor member or carcass conveyor member, respectively.

19. The method of claim 2, wherein the viscera package is transferred to the combined conveyor member immediately after it has been drawn and separated from the carcass.

20. The method of claim 1, wherein prior to the inspection at least the intestines, and in particular the intestines and the gall bladder, are removed from the viscera package.

21. The method of claim 1, wherein before the viscera package is drawn out of the carcass of the poultry at least the intestines, and in particular the intestines and the gall bladder, are removed from the carcass.

22. A device for processing slaughtered poultry, comprising:
an eviscerating device for drawing a viscera package out of a carcass of the poultry;
separating means for separating the viscera package from the carcass;
a viscera package conveyor member for conveying the viscera package;
a carcass conveyor member for conveying the carcass; and
an inspection station for inspecting the viscera package and the carcass, wherein the viscera package conveyor member and the carcass conveyor member are adapted to be coupled together by a coupling movable together with the viscera package conveyor member and the carcass conveyor member at least in the inspection station.

23. The device of claim 22, wherein the viscera package conveyor member and the carcass conveyor member form part of one combined conveyor member.

24. The device of claim 22, comprising:
a first conveyor, which is arranged upstream with respect to the inspection station, for conveying the carcass;
a second conveyor, which is arranged upstream with respect to the inspection station, for conveying the viscera package;
a transfer device, which is arranged upstream with respect to the inspection station, for transferring the viscera package from the second conveyor to the first conveyor.

25. The device of claim 24, comprising a transfer device, which is arranged downstream with respect to the inspection station, for transferring the viscera package from the first conveyor to the second conveyor.

26. The device of claim 22, comprising:
a first conveyor, which is arranged upstream with respect to the inspection station, for conveying the carcass;
a second conveyor, which is arranged upstream with respect to the inspection station, for conveying the viscera package;
a transfer device, which is arranged upstream with respect to the inspection station, for transferring the carcass from the first conveyor to the second conveyor.

27. The device of claim 26, comprising a transfer device, which is arranged downstream with respect to the inspection station, for transferring the carcass from the second conveyor to the first conveyor.

28. The device of claim 22, comprising:
a first conveyor, which is arranged upstream with respect to the inspection station, for conveying the carcass;
a second conveyor, which is arranged upstream with respect to the inspection station, for conveying the viscera package; and
a transfer device, which is arranged upstream with respect to the inspection station, for transferring the viscera package from the second conveyor to a third conveyor and transferring the carcass from the first conveyor to the third conveyor.

29. The device of claim 28, comprising a transfer device, which is disposed downstream with respect to the inspection station, for transferring the carcass and/or the viscera package from the third conveyor to the first or second conveyor, respectively.

30. The device of claim 22, comprising:
a first conveyor, which is arranged upstream with respect to the inspection station, for conveying the carcass;
a second conveyor, which is arranged upstream with respect to the inspection station, for conveying the viscera package; and
a transfer device, which is arranged upstream with respect to the inspection station, for transferring the viscera package from the second conveyor to a third conveyor.

31. The device of claim 30, comprising a transfer device, which is arranged downstream with respect to the inspection station, for transferring the viscera package from the third conveyor to the second conveyor.

32. The device of claim 22, comprising:
a first conveyor, which is arranged upstream with respect to the inspection station, for conveying the carcass;
a second conveyor, which is arranged upstream with respect to the inspection station, for conveying the viscera package; and
a transfer device, which is arranged upstream with respect to the inspection station, for transferring the carcass from the first conveyor to the third conveyor.

33. The device of claim 32, comprising a transfer device, which is arranged downstream with respect to the inspection station, for transferring the carcass from the third conveyor to the first conveyor.

34. The device of claim 24, wherein each transfer device is adapted to transfer the viscera package conveyor member and/or the carcass conveyor member.

35. The device of claim 23, wherein the separating means are adapted to transfer the viscera package to the combined conveyor member.

36. The device of claim 22, wherein the carcass conveyor member comprises a hook for carrying at least one leg of the carcass.

37. The device of claim 22, wherein the viscera package conveyor member comprises a clamping device for carrying the viscera package.

38. The device of claim 22, wherein the viscera package conveyor member comprises a gap or recess for carrying the viscera package.

39. The device of claim 22, wherein the viscera package conveyor member comprises one or more pointed projections for at least partially boring through an organ and carrying the viscera package by means of the projection(s).

40. A poultry viscera package conveyor member, comprising a coupling for coupling the viscera package conveyor member and a carcass conveyor member together at least in an inspection station, the coupling being movable together with the viscera package conveyor member.

41. A poultry carcass conveyor member, comprising a coupling for coupling the carcass conveyor member and a viscera package conveyor member together at least in an inspection station, the coupling being movable together with the carcass conveyor member.

42. A conveyor member comprising a coupling for coupling a viscera package conveyor member and a carcass conveyor member together at least in an inspection station, the coupling being movable together with the viscera package conveyor, wherein the viscera package conveyor member and the carcass conveyor member form part of one combined conveyor member.

* * * * *